INVENTORS
ALFRED BENNETT
CORLES M. PERKINS

BY

ATTORNEY

United States Patent Office 2,745,614
Patented May 15, 1956

2,745,614

AIRCRAFT CONTROL SYSTEM

Alfred Bennett, New York, N. Y., and Corles M. Perkins, Anoka, Minn., assignors to Bendix Aviation Corporation, Teterboro, N. J., a corporation of Delaware Application August 23, 1952, Serial No. 306,022

10 Claims. (Cl. 244—77)

The present invention relates generally to the control of aircraft or other airborne vehicles and more particularly to a novel apparatus for automatically guiding an aircraft or airborne vehicle to a desired landing field or runway in accordance with radio beams transmitted from the field.

In systems of this character, the output of a radio receiver usually defines the flight path of the craft. The information received from the radio beams of the instrument landing system is angular in character. In other words, the receiver obtains a measure of the number of degrees subtended between a line from the center of the aircraft to the transmitter and a line representing the axis of the radio beam. For a given angular displacement, the actual distance from the axis of the beam to the center of the aircraft decreases as the craft approaches the transmitter.

The aircraft is generally taken under automatic control at a point some distance from the beam axis. The path of the aircraft to the beam axis may then be controlled by the combination of (1) integrated signals from various sensors, the magnitudes of the signals depending only upon the direction of displacement and the time of displacement of the craft from the beam axis; and (2) a displacement signal whose magnitude depends upon the craft's angular displacement from the axis.

The displacement signal is insensitive to changing control conditions as the craft approaches the transmitter, so the integrated signals are used to provide the necessary correction. For the required amount of correction, however, only a small build-up of the integrated signals is necessary. Within the interval of time between the engagement of the automatic approach system and the aircraft's first crossing of the beam, the integrated signals may build-up to undesirable excessive values. Such excessive signal values will produce an overcorrection, thus rendering these signals useless for correcting the displacement signals. The excessive integrated signal values cause the aircraft to intercept the beam axis at an unnecessarily large "crab" angle. This creates an undesirable condition of instability since the "crab" angle is not a correction for wind but a signal memory due to characteristics of the computer, itself. On subsequent interceptions of the beam axis, the deviation of the aircraft from the beam axis is not large. Accordingly, the build-up of the integrated signals keeps within working range, providing the proper correction for the displacement signal and holding the "crab" angle to a minimum value.

An object of the present invention, therefore, is to provide a novel automatic radio approach control system that will permit an aircraft to smoothly and stably intercept the beam axis.

Another object is to provide a novel arrangement for preventing the excessive build-up of correction signals before an automatic pilot comes within the desired operating range of the guide beam.

A further object is to provide a novel device for better controlling an automatic pilot as it brackets a guide beam.

A still further object is to provide a novel means for initiating the operation of automatic pilot system control signal components at a prescribed craft position.

The foregoing and other objects and advantages of this invention will appear more fully hereinafter from a consideration of the detailed description which follows, taken together with the accompanying drawings wherein one embodiment of the invention is illustrated by way of example. It is to be expressly understood, however, that the drawings are for illustration purposes only, and are not to be construed as defining the limits of the invention.

In the drawings, wherein like reference numerals refer to like parts:

The novel automatic approach control system of the present invention is designed to operate with conventional localizer flight path transmitters located at the airport to which the craft is heading. The transmitter, generally located at the far end of the runway, emits a radio pattern consisting of two overlapping energy lobes. One of the lobes is so modulated as to represent the left hand field of the localizer pattern. The other of the lobes is so modulated as to represent the right hand field of the localizer pattern. A line drawn through the center of the overlaps of each pair of lobes defines an imaginary line straight down the center of the runway and out into space for some distance.

Figure 1:
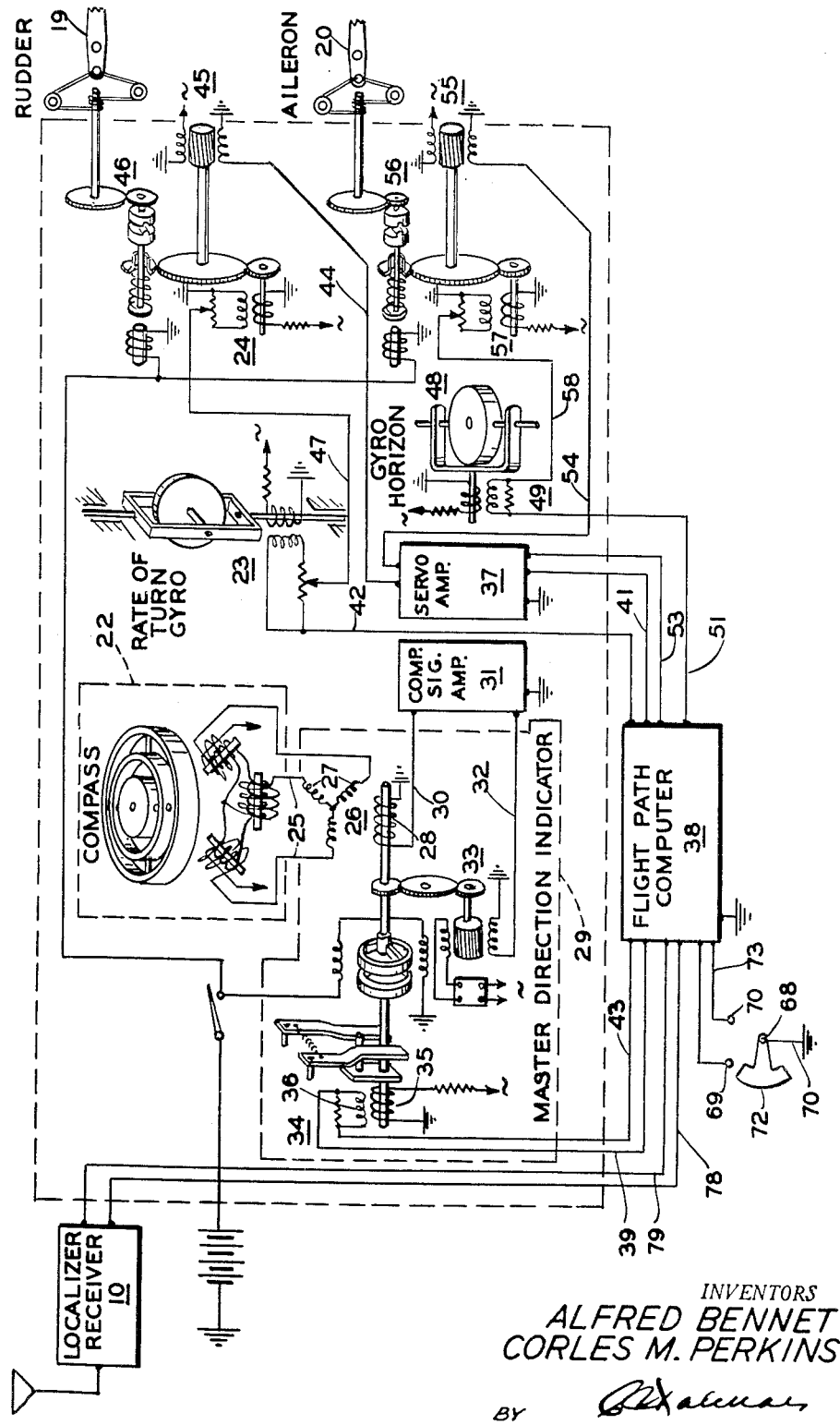
Figure 1 is a diagrammatic illustration of an automatic steering system for mobile craft embodying the novel automatic approach control system of the present invention.

For guiding an aircraft to the landing field, a conventional radio receiver 10, Figure 1, receives the lateral guidance signal from the localizer transmitter, and in response develops at its output a direct current signal. The magnitude of the signal is proportional to the angular displacement between a line from the center of the aircraft to the transmitter and a line representing the axis of the beam. The polarity of the signal is determined by the direction of displacement of the craft from the beam axis.

Referring now to Figure 1, the novel instrument landing control system of the present invention is illustrated in a general manner, for a better understanding of the present invention, in cooperative association with an aircraft automatic pilot system, which may be of the character described and claimed in copending application Serial No. 516,488, filed December 31, 1943, now Patent No. 2,625,348. Only the controls of such a pilot for the rudder and aileron surfaces 19 and 20 are illustrated.

As described more in detail in aforementioned patent, the control of rudder 19 is derived from a gyro-stabilized earth inductor type compass 22, a rate of turn gyro take-off 23, and a follow-up device 24. The control of aileron 20 is derived from a bank take-off 49 on a gyro horizon 48 and a follow-up device 57.

Compass 22 develops a signal proportional to the amount of displacement of the craft from a prescribed heading. Leads 25 feed this signal into stationary winding 27 of an induction device 26, located within a master direction indicator 29. As a consequence, a directional displacement signal is induced within the rotor winding 28 of the inductive device 26. This displacement signal is applied to the input of a vacuum tube amplifier 31 by way of lead 30. Lead 32 communicates the output of amplifier 31 to energize a motor 33.

The operation of motor 33 not only returns rotor winding 28 of induction device 26 to a null position but also rotates the rotor winding 35 of a signal transmitter 34 to reproduce the directional displacement signal potential within stator winding 36. The directional displacement or heading signal reproduced within stator winding 36 is communicated to the rudder channel input of a servo amplifier 37 through a flight path computer 38. This is accomplished by means of a lead 39, and armature 40E engaged with a fixed contact 40F of a relay 40 (Figure 3) located within unit 38, and a lead 41.

Fed into the input of the rudder channel of servo amplifier 37 in series with the heading signal is a rate of turn signal developed by the rate of turn gyro take-off 23. A lead 42 connects the take-off 23 in series with stator winding 36 of a signal transmitter 34 by means of a fixed contact 40C engaged with armature 40B of relay 40 (Figure 3), and a lead 43.

The output of the rudder channel of servoamplifier 37 by means of a lead 44 energizes a rudder servomotor 45. Rudder 19, when displaced by servomotor 45 acting through a speed reduction system 46, returns the craft to its prescribed course. At the same time servomotor 45 operates inductive follow-up device 24 through a speed reduction gear system to develop an electrical follow-up signal. Lead 47 feeds the follow-up signal into the input of the rudder channel of servoamplifier 37 in series with the compass heading and rate of turn signals.

For craft attitude control, an electrical signal develops within take-off 49 of a horizontal gyro 48 in response to craft bank. This signal is fed to the aileron channel input of amplifier 37 through flight path computer unit 38 by means of a lead 51, armatures 52B and 52E which engage with interconnected fixed contacts 52C and 52F, respectively, of a relay 52 (Figure 3), and a lead 53.

The output of the aileron channel servoamplifier 37 conducted by way of lead 54 energizes an aileron servomotor 55. Thus, the aileron 20, displaced as motor 55 operates through a speed reduction gear system 56, reestablishes level craft attitude. At the same time, motor 55, through a gear system, operates inductive follow-up device 57 to develop an electrical follow-up signal. Lead 58 feeds the follow-up signal into the input of the aileron channel of servoamplifier 37 in series with the bank signal.

The foregoing is intended to allustrate a conventional automatic pilot system. Turning now to the novel instrument landing system of the present invention, the aircraft is headed to intercept the localizer beam pattern. Upon the interception of the beam pattern, the aircraft is brought to the heading of the beam axis to provide the proper heading control when the aircraft attains the beam axis. In response to the direct current signal developed at the output of radio receiver 10, signals created by the localizer flight path computer unit 38 and inserted into the automatic pilot operte the craft's control surfaces.

On automatic approach, the computer 38 is operatively connected into the automatic steering system. The craft rudder is actuated, then, in response to heading, rate of change of heading, follow-up and localizer flight path computer signals. Aileron control, also, is atomatically effected through heading, bank, follow-up and computer signals.

Figure 3:
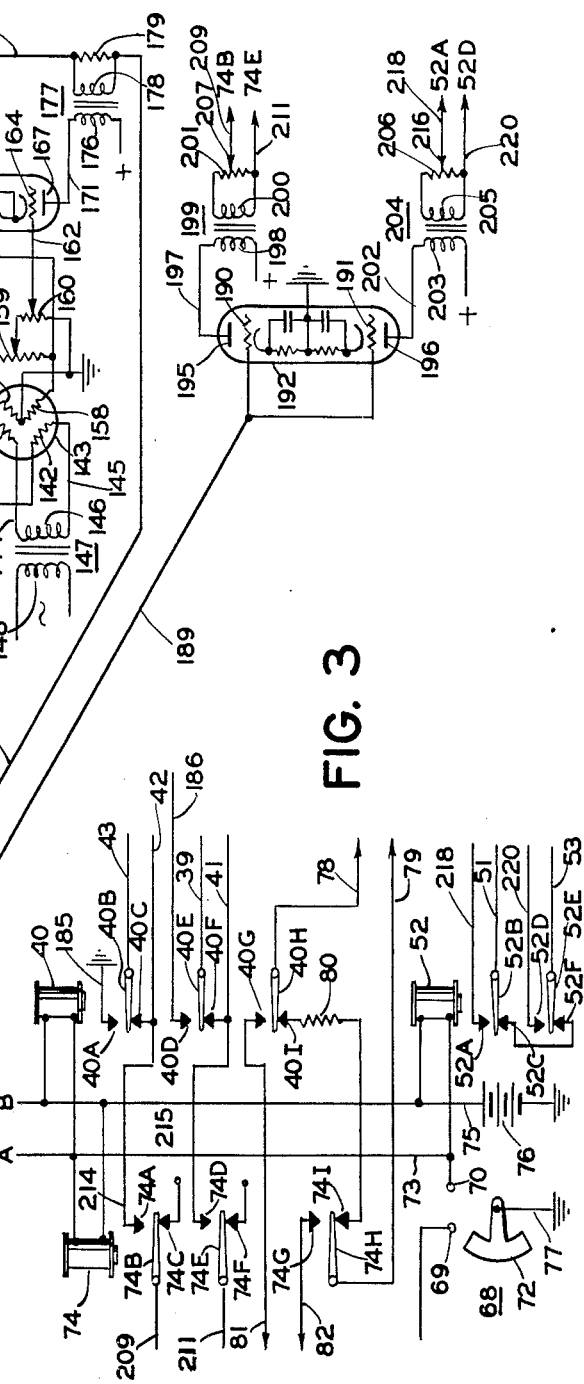
Figure 3 is a wiring diagram of the relay control system of the computer of the novel automatic approach control system of the present invention.

The signal of computer 38 is communicated to the input of the rudder and aileron channels of servoamplifier 37 of the automatic pilot upon the operation of a switch 68 (Figure 3). The terminals 69 and 70 of switch 68 are spaced equidistantly along the arc of a circle whose center is the axis of rotation of switch arm 72. The switch arm 72 has a width and length sufficient to make simultaneous contact with both of the terminals. Thus, when arm 72 engages terminal 70, it is still in contact with terminal 69.

Terminal 69 of switch 68 is connected to the heater circuits of the various vacuum tubes that are employed within computer 38. A line 73 connects terminal 70 of switch 68 with the conductor 75 of battery 76 through the parallel connected coils of relays 40, 52, and 74. The negative terminal of battery 76 is connected to ground. A lead 77 also grounds switch arm 72.

Before engaging computer 38 operatively with the automatic pilot, a sufficient time must be allowed after the engagement of switch arm 72 with terminal 69 for the cathode heaters of the various tubes of unit 38 to warm up. Thereafter, the aircraft is brought manually onto a heading parallel with the localizer beam axis and switch arm 72 is engaged with terminal 70. Such engagement energizes relays 40, 52, and 74, and operatively connects computer 38 with the automatic pilot.

Figure 2:
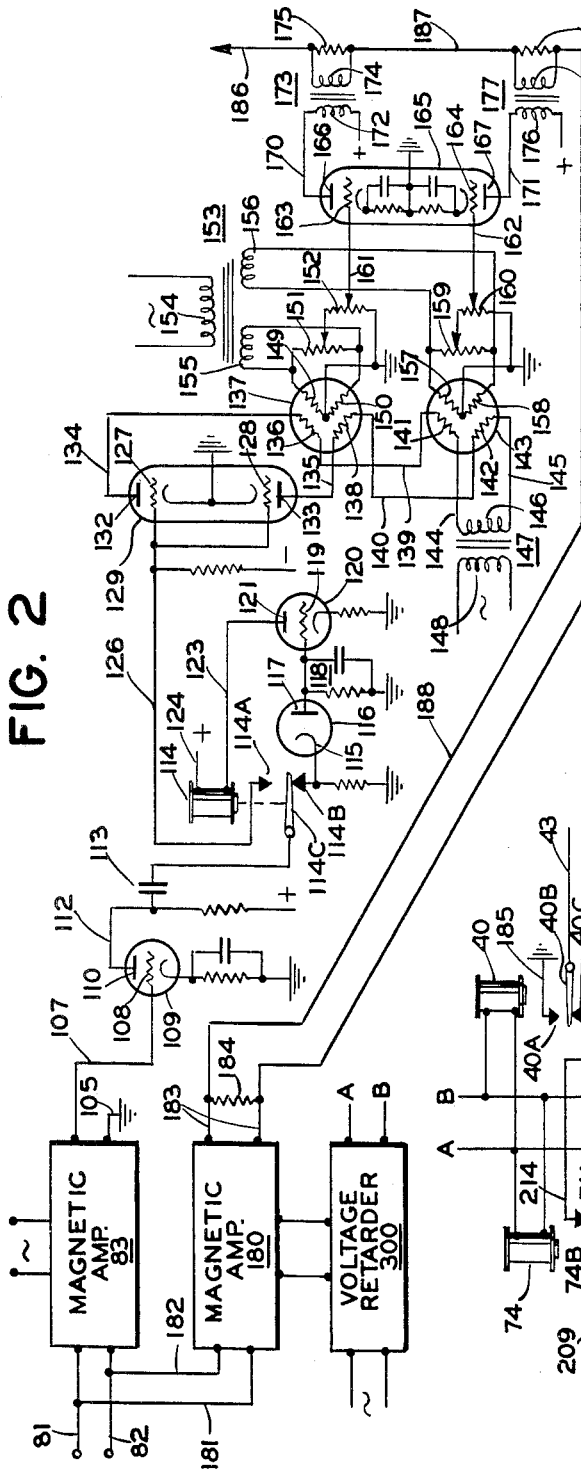
Figure 2 is a schematic diagram of the flight path computer of the novel automatic approach control system of the present invention.

The output of radio receiver 10 is fed into computer 38 by way of leads 78 and 79 to armatures 40H and 74H of relays 40, 74 respectively. When relays 40 and 74 are de-energized, that is, when switch arm 72 of switch 68 is out of engagement with terminal 70, armatures 40H and 74H normally engage fixed contacts 40I, 74I. The direct current potential signal developed by radio receiver 10, then, is impressed only across the load resistor 80 that interconnects contacts 40I and 74I. However, upon the energization of relays 40 and 74 as switch arm 72 engages contact 70, armatures 40H, 74H disengage from contacts 40I, 74I and engage with fixed contacts 40G, 74G. The direct current potential developed by radio 10, then, feeds directly by way of leads 81 and 82 to the input of a magnetic inverter-amplifier 83 (Figure 2).

Amplifier 83 in response to the direct current signal develops an alternating current signal. The amplitude of the signal corresponds to the craft displacement from the beam while the phase corresponds to the direction of displacement. One such amplifier is described in co-pending application Serial No. 700,234, filed September 30, 1946, which has become Patent No. 2,678,419 issued May 11, 1954.

Lead 105 grounds one output terminal of magnetic inverter amplifier 83. The other terminal is connected by means of a lead 107 to the grid 108 of an amplifier tube 109. Plate 110 of tube 109 is connected by means of lead 112 through bypass condenser 113 to armature 114C of relay 114.

When relay 114 is de-energized, armature 114C normally engages a fixed contact 114B which is connected to the cathode 115 of a rectifier tube 116. Plate 117 of rectifier 116 is connected by means of a resistance-capacitator low-pass filter 118 to the grid 119 of a triode 120. Lead 123 connects the plate 121 of triode 120 to one terminal of the operating coil of relay 114. Lead 124 connects the other terminal of relay 114 to a suitable direct current source for the positive plate supply of triode 120. When relay 114 is energized, armature 114C engages fixed contact 114A. Lead 126 connects contact 114A to the grids 127 and 128 of a discriminator tube 129.

Lead 134 connects plate 132 of discriminator 129 to heater element 136 of thermal device 137 while plate 133 is connected by means of lead 135 to heater element 138 of thermal device 137. Leads 139 and 140 connect the heater elements 136 and 138 to the heater elements 141 and 142 of a thermal device 143. Leads 144 and 145 connect the heater elements 141 and 142 of thermal device 143 to the end terminals of a grounded center-tapped secondary winding 146 of transformer 147. Secondary winding 146 provides the potential to plates 132 and 133 of discriminator tube 129. A suitable source of alternating current energizes primary winding 148 of transformer 147.

A pair of resistors 149 and 150 are mounted within the sealed tube of thermal device 137, and are arranged in heat exchange relation with heater elements 136 and 138. One terminal of each resistor is grounded. These resistors are arranged to constitute two adjacent arms of a resistance bridge circuit. The other two adjacent arms of the bridge circuit are outside of the sealed tube of thermal device 137 and comprise portions of a center-tapped resistor 151 whose respective end terminals are connected to the ungrounded terminals of resistors 149 and 150. A variable tapped resistor 152 connects across the diagonal of the resistance bridge formed by the center tap of resistor 151 and the lead grounding the junction of resistors 149 and 150. Secondary winding 155 of a transformer 153 energizes the bridge circuit across the diagonal formed by the junctions of resistors 151 with resistors 149 and 150. A suitable source of alternating current excites the primary winding 154 of transformer 153.

Thermal device 143 also is a sealed tube. In it, resistors 157 and 158 are arranged in heat exchange relation with heater elements 141 and 142. One terminal of each resistor is grounded, and both resistors are arranged to constitute two adjacent arms of a resistance bridge circuit. The other two adjacent arms of the bridge circuit are outside of the sealed tube of device 143 and comprise portions of a center-tapped resistor 159 whose end terminals are connected to the ungrounded terminals of resistors 157 and 158. A variable resistor 160 connects across the diagonal of the resistance bridge formed by the center tap of resistor 159 and the grounded junction of resistors 157 and 158. Secondary winding 156 of transformer 153 energizes the bridge circuit across the diagonal formed by the junction of resistor 159 and resistors 157 and 158.

The movable contact arms of resistors 152 and 160 are connected by means of leads 161 and 162 to the grids 163 and 164 of a dual amplifier 165. Lead 170 connects plate 166 of amplifier 165 to the primary winding 172 of a coupling transformer 173 whose secondary winding 174 is connected across the end terminals of a resistor 175. Lead 171 connects plate 167 to the primary winding 176 of a coupling transformer 177 whose secondary winding 178 is connected across the end terminals of a resistor 179.

The alternating current signal developed at the output of magnetic inverter amplifier 83 is amplified by triode 109 and applied to cathode 115 of rectifier 116. In response, rectifier tube 116 applies a direct current potential to the low pass filter 118 and to the grid 119 of triode 120. The magnitude of the direct current on grid 119 is proportional to the direct current applied to the input of magnetic inverter amplifier 83 which, in turn, is proportional to the angular displacement between the beam axis and the aircraft.

The bias on grid 119 of triode 120 is set at such value that as the aircraft approaches the beam axis, thereby, decreasing said bias so that the plate current of said triode increases until such a value is reached that relay 114 finally operates at the predetermined position of the craft with respect to the beam axis at which it is desirable to introduce the integrated signals. When relay 114 operates, armature 114C disengages from contact 114B and engages with contact 114A. Accordingly, at a predetermined angular displacement from the beam axis, the output of amplifier 109 is impressed upon grids 127 and 128 of discriminator tube 129 to initiate the build-up of the integrated signals. The disengagement of armature 114C from contact 114B removes the preset bias from grid 119 of triode 120. The resulting continuous flow of current from plate 121 holds relay 114 in its energized position.

Phase discriminator tube 129, responding to the phase of the signal which corresponds to the direction of the angular displacement of the aircraft from the beam axis and operating as a selective switch, determines whether thermal device 137 or 143 becomes operative. At zero signal potential, grids 127 and 128 of discriminator tube 129 are normally biased to cut off the operation of the discriminator. Upon craft displacement from the beam axis, the resulting signal neutralizes the bias on grids 127 and 128 and causes either plate 132 or 133 to conduct. The polarity of the direct current signal from receiver 10 determines whether plate 132 or 133 conducts current through associated heater elements 136 and 141 or 138 and 142. The amount of current flowing through either plate 132 or 133 upon the neutralization of the grid bias is determined by the magnitude of the plate potential. The plate current bears no relation to the amount of angular displacement of the aircraft from the beam axis.

When the direction of displacement from the beam axis is such that the phase of the signal potential applied to grids 127 and 128 of discriminator tube 129 causes plate 132 to become conductive and plate 133 to remain non-conductive, current flows through heater elements 136 and 141 of thermal devices 137 and 143. The heating resulting from the current flow through heater 136 gradually increases to a new value the resistance of resistor 149. The new resistance value unbalances the bridge circuit of which the resistor is a member. Accordingly, across resistor 152 a time retarded voltage develops which progressively builds up to its steady state value in thirty seconds. Likewise, the heating, resulting from the current flow through heater 141, gradually increases to a new value the resistance of resistor 157. An unbalance of the bridge circuit of which resistor 157 is a member develops across resistor 160 a time retarded voltage. This voltage builds up to its steady state value in four minutes. The voltages developed across resistors 152 and 160 are impressed means of dual amplifier 165 and coupling transformers 173 and 177 across resistors 175 and 179. (Time delay devices 137 and 143 have been described as having a build-up time of thirty seconds and four minutes, respectively. However, it is obvious, and it is specifically understood that they may be designed to possess any other desired time characteristic.)

When the direction of craft displacement from the beam axis is such that the phase of the signal applied to grids 127 and 128 of discriminator tube 129 causes plate 133 to conduct and plate 132 to remain non-conductive, current flows through the heater 138 and 142 of thermal devices 137 and 143. The heating, resulting from the current flow through heater 138, gradually increases to a new value the resistance of resistor 150. An unbalancing of the bridge circuit of which resistor 150 is a member develops across resistor 152 a time retarded voltage, having a phase opposite to that caused by the unbalance of resistor 149. This voltage similarly builds up to its steady state value in thirty seconds. Likewise, the heating resulting from the current flow through heater 142 gradually increases to a new value the resistance of resistor 158 producing thereby an unbalance of the bridge circuit of which the resistor is a member. Consequently, a time retarded voltage develops across resistor 160. This voltage has a phase opposite to that caused by the unbalance of resistor 157 and builds up to its steady state value in four minutes.

Since phase discriminator 129 operates under saturation conditions, the magnitudes of the signal developed across resistors 175 and 179 do not vary with the angular displacement of the aircraft relative to the beam axis. They vary only with the direction and period of time that the aircraft is displaced from the beam axis.

To secure a signal that is responsive to the angular displacement between the aircraft and the beam axis, as distinguished from the above discussed signals which are responsive to the direction and period of time that the craft has been displaced from said beam axis, the direct current potential developed by radio receiver 10 is also impressed upon the input of a second magnetic inverter amplifier 180 by means of leads 181 and 182 tapped off leads 81 and 82.

Magnetic inverter amplifier 180 is identical to device 83 in structure and operation. Inverter 180 develops at its output lead 183 an alternating current signal whose magnitude is proportional to the angular displacement of the aircraft from the beam axis and whose phase is determined by the direction of displacement.

When the automatic approach control system is engaged at the extreme limits of the beam pattern, it is not feasible to insert at once the alternating current signal potential developed at the output of device 180 into the automatic pilot. The initial excessive magnitude of such a signal would displace the rudder and aileron control surfaces so suddenly and violently to their extreme positions as to cause a turning aircraft to roll over. The alternating current signal developed at the output of magnetic inverter amplifier 180 is made usable by retarding its initial build-up during its insertion into the automatic pilot. Thus, the rudder and aileron control surfaces are only gradually displaced to their desired positions so that the aircraft may be turned in the direction of the beam axis without rolling over. Voltage retardation means 300, initially retarding the alternating current signal developed at the output of the magnetic inverter amplifier 180 to secure a gradual build-up of the signal to its final value, is disclosed and described in detail in U. S. Patent No. 2,575,890 granted to C. M. Perkins et al. on November 20, 1951. Connections A and B show the terminals by which the retarder is connected into the circuit. The gradually increasing signal potential developed at the output of magnetic inverter amplifier 180 is impressed by means of leads 183 across resistor 184.

Three independent alternating current control signals are developed by the flight path computer 38. The first signal, impressed across resistor 175, progressively builds up to its steady state value in thirty seconds. The second signal, impressed across resistor 179, progressively builds up to its steady state value in four minutes. The third signal is impressed across resistor 184. The first and second control signals are responsive only to the direction of displacement and interval of time of displacement from the beam axis. The third signal is responsive to the amount and direction of angular displacement between a line from the center of the aircraft to the transmitter and the line that is axis of the beam.

The combined use of three control signals compensates for the change in control action of the system as the aircraft approaches the transmitter. This changing action is due to the change in actual distance of the craft from the beam axis for a given angular displacement as the craft nears the transmitter. If, for example, the craft is within the minimum operating range of the transmitter, the first and third control signal provides the proper amount of rudder and aileron deflection to bring the craft onto the ground track of the beam axis without over control. Again, if the aircraft is at the outer limits of the operating range of the transmitter, the three control signals combine to provide the proper amount of rudder and aileron deflection to bring the craft onto the ground track of the beam axis without over control.

When the aircraft is placed under the control of the novel automatic approach system of the present invention, the heading signal of compass 22 is introduced into flight path computer 38, where it is algebraically added to the three control signals developed in the computer. The compass signal provides the required heading control to direct the craft to attain the heading of the beam axis. The control signals developed by computer 38 direct the aircraft toward the beam axis. The combination of the compass and the control signals then directs the aircraft onto the ground track as defined by the beam axis together with the proper heading to maintain the track.

The compass heading signal, it will be remembered is reproduced within stator winding 36 of signal transmitter 34 and is communicated by means of lead 39, armature 40E engaged with fixed contact 40F of relay 40 (Figure 3), and lead 41 to the rudder channel input of servoamplifier 37. It is also connected by means of lead 43, armature 40B engaged with fixed contact 40C of relay 40, and lead 42 in series with the rate of turn signal generator 23. As switch arm 72 engages terminal 70, the compass signal is connected in series with the three control signals developed by flight path computer 38. Such switch operation energizes relay 40 whereupon armatures 40B and 40E disengage from contacts 40C and 40F and engage with contacts 40A and 40D. Contact 40A is grounded by means of lead 185 (Figure 3). Lead 186 connects contact 40D (Figure 3) to one end of resistor 175 (Figure 2). In this manner the compass heading signal is fed into the computer 38.

Lead 187 connects the end of resistor 175 opposite the end connected with lead 186 to one end of a resistor 179. A lead 188 connects the other end of resistor 179 to one end of resistor 184. Resistor 184 has its other end, in turn, connected by means of lead 189 to the grids 190, 191 of an isolator tube 192.

Lead 197 connects plate 195 of isolator tube 192 to the primary winding 198 of a coupling transformer 199. Secondary winding 200 of transformer 199 is connected across the end terminals of the variable resistor 201 which is associated with the rudder channel of the automatic pilot. Lead 202 connects plate 196 of isolator tube 192 to the primary winding 203 of a coupling transformer 204. The secondary winding 205 of transformer 204 is connected across the end terminals of a variable resistor 206 which is associated with the aileron channel of the automatic pilot.

The signals impressed across resistors 175, 179, 184 together with the heading signal of compass 22 combine algebraically for rudder control at resistor 201 and for aileron control at resistor 206. In other words, the algebraic sum of the three control and compass signals is impressed upon both grids 190 and 191 of isolator tube 192 to develop control potentials across resistors 201 and 206 for rudder and aileron.

For adjusting the signal potential across resistor 201 to the optimum value for the rudder channel, resistor 201 has an adjustable tap connection 207. This tap is connected by lead 209 to armature 74B of relay 74 (Figure 3). Lead 211 connects the end terminal of resistor 201 that is opposite tap connection 207 to armature 74E of relay 74. Upon energization of relay 74, armatures 74B and 74E disengage from contacts 74C and 74F and engage with contacts 74A and 74D, respectively. Lead 214 connects fixed contact 74A to fixed contact 40C of relay 40. Fixed contact 74D, is connected by means of lead 215 to fixed contact 40F of relay 40. In this manner, upon the energization of relays 74 and 40, the compass signal and the three control signals developed by flight path computer 38 are fed into the input of the rudder channel of servoamplifier 37 in series with the signals of rate of turn take-off 23 and follow-up device 24.

For adjusting the signal across resistor 206 to the optimum value for the aileron channel of servoamplifier 37, resistor 206 has an adjustable tap connection 216. Lead 218 connects tap 216 to fixed contact 52A of relay 52 (Figure 3). Lead 220 connects the end terminal of resistor 206 that is opposite tap connections 216 to the fixed contact 52D of relay 52. Upon energization of relay 52, armatures 52B and 52E disengage from contacts 52C and 52F and engage with contacts 52A, 52D. The aileron displacement signal developed by the computer 38, thus, is inserted into the input of the aileron channel of servoamplifier 37 in series with the signals of bank take off 49 and follow-up device 57.

The three control signals, developed by computer 38 and inserted into the automatic pilot, displace the rudder and aileron surfaces from their normally centered position in a direction to turn the craft toward the beam axis. During the approach of the aircraft to the beam axis, the compass signal acts continuously to restore the heading of the craft to a heading parallel to the beam axis.

Upon the interception of the beam axis, the direct current signal developed by radio receiver 10 drops to zero. As a result, the signals developed at the outputs of magnetic-inverter amplifiers 83 and 180 (Figure 2) also drop to zero. Therefore, the signal resulting from these signals across resistor 184 immediately drops to zero. However, those signals across resistors 175 and 179 do not drop immediately to zero but, instead, only slowly decay to zero. The presence of these signals across resistors 175 and 179 upon the aircraft's interception of the beam axis effects the magnitude of the angle of interception or "crab" angle.

The slow decay of signals across resistors 175 and 179 is due to the gradual cooling of heated resistors 149, 150, 157 and 158 of the thermal delay devices 144 and 151. A continual unbalance of the bridge circuit of which they are parts exists until they cool to normal temperature. It is desirable that resistors 159, 150, 157 and 158 attain their normal temperatures and, therefore, their normal resistance values when the craft intercepts the beam so as to secure immediate reverse operation should the craft cross over the beam.

The novel arrangement involving relay 114, rectifier tube 116 and triode 120 utilizes the displacement signal to control the flight path of the aircraft relative to the beam axis so that an excessive build-up of the integrated signals which could result in the slow decay of the signals across resistors 175 and 179 does not occur.

Armature 114C is normally held in engagement with terminal 114B by a spring or other suitable means (not shown). Because of the bias on grid 119 of triode 120, current does not immediately flow in lead 126 to the time delay circuits when switch arm 72 contacts terminal 70. Thus, no signal will be impressed immediately across resistances 175 and 179. A signal will flow to the time delay circuit only when the signal potential from magnetic inverter amplifier 83 through lead 107 amplifier 109, lead 112, rectifier 116, and low pass filter 118 to grid 119 reaches a sufficient value to overcome the bias on grid 119 sufficiently to operate relay 114. At this time armature 114C disengages from terminal 114B and engages with terminal 114A. Therefore, the integrated signal is employed only at the desired time when the aircraft has reached a predetermined angular position with respect to the beam axis. With the present invention, excessive slow-decaying signals do not build-up across resistors 175 and 179; the plane intercepts the beam at a desirable "crab" angle, so no initial condition of instability is created.

Should the aircraft intercept the beam axis and pass on the other side of the axis, the compass signal continues to act upon the rudder and aileron surfaces to restore the craft to its original heading parallel to the beam axis. Flight path computer 38 begins to operate again. In the manner heretofore described, the computer will develop reverse turn signals to displace rudder and aileron surfaces 19 and 20 to turn the aircraft back toward the beam axis. If the aircraft again goes beyond the beam axis and makes a second crossing, compass 22 and computer 38 continue to operate until the craft has attained the ground track defined by the beam axis with the proper heading.

The automatic approach system becomes a simple operation. As an aircraft approaches its destination, and it is desired to go into the automatic approach procedure for landing, radio 10 is tuned to the frequency of the approach system. Arm 72 of switch 68 is engaged with terminal 69 to warm up the heaters in the tubes of computer 38. The speed of the aircraft is reduced to approach speed, and the aircraft is headed to intercept the beam pattern. Upon interception of the beam pattern, the aircraft is brought to a heading parallel to the beam axis. At this time switch arm 72 is engaged with terminal 70 to connect computer 38 into the automatic pilot system. In response to the signals developed by computer 38 and the heading signal of compass 22, the aircraft attains the ground track of the localizer flight path beam axis at the proper heading.

As will now be apparent to those skilled in the art, a novel and desirable navigational device has been provided for automatically steering a craft for instrument or blind landing purposes.

Although but one embodiment of the invention has been illustrated and described in detail, various changes and modifications in the form and relative arrangement of parts, which will now appear to those skilled in the art, may be made without departing from the scope of the invention.

We claim:

1. In an automatic steering system for a vehicle having a movable control surface, a servomotor for operating said surface, reference means on said vehicle for generating a reference signal corresponding to the extent of angular displacement of the vehicle from a predetermined position, first means responsive to said reference signal for developing a first control signal for operating said servomotor, second means responsive to said reference signal for developing a second control signal for operating said servomotor, the magnitude of said second signal being determined by the time of persistence of said reference signal, and control means connected for operation by said reference signal for rendering said second means ineffective when said reference signal is of one value and rendering it effective when said reference signal is another value.

2. Apparatus for steering a vehicle having a movable control surface and a servomotor for moving said surface, comprising means for developing a signal corresponding to the turning of said vehicle from a direction parallel to a predetermined ground track, means for developing a signal corresponding to the angular displacement of said vehicle from said predetermined ground track, means for developing a signal corresponding to the time of persistence of said displacement signal, means operated by the displacement signal when the latter attains a predetermined value to initiate the development of the time signal, and means for operating said servomotor in accordance with said signals.

3. Apparatus for automatically guiding an aircraft on a prescribed path toward a fixed point, comprising a radio receiver on said craft for receiving radiant energy transmitted from said fixed point, means for deriving from said received energy a first control signal which is a function of the angular displacement of said aircraft from said path, a means for deriving a further signal from said received energy which is a function of the time duration of said first signal, a means for rendering said further signal means inoperative until a predetermined first signal strength is reached, and a means responsive to said signals for controlling craft flight along said path.

4. Apparatus for automatically guiding an aircraft having an automatic pilot thereon together with means for receiving energy transmitted from a given station which provides a predetermined path for said aircraft toward a fixed point, said apparatus comprising means connected to said radiant energy receiving means for deriving from said received energy a control signal which is a function of the angular displacement of said aircraft from said path, a means responsive to said signal for communicating a control signal in a delayed manner to said automatic pilot, and a means associated with said delaying means and responsive to said displacement signal for rendering said delay means inoperative until the displacement signal reaches a predetermined value.

5. Apparatus for automatically guiding an aircraft onto a ground track as defined by a source of radiant energy, comprising a means for deriving from the source of radiant energy a signal proportional to the angular displacement of the aircraft from said ground track, a means for deriving from the displacement signal a further signal dependent upon the time of persistence of said displacement signal, a means responsive to the displacement signal for controlling the initial operation of said time signal means, and a means responsive to said displacement and time signals for steering the craft to and maintaining it on said ground track.

6. Apparatus for an aircraft having thereon an automatic pilot and a receiving means for receiving radiant energy for guiding said craft onto a ground track as defined by a source of radiant energy and developing an output, comprising a means for deriving from said output a signal proportional to the angular displacement of the aircraft from said ground track, a means for developing a signal proportional to the time of persistence of said displacement signal, a means associated with the last said means rendered inoperative until the displacement signal initially attains a predetermined value for initiating operation of the time signal means, and a means for inserting the displacement and time signals into the automatic pilot to steer the craft onto said ground track.

7. In an automatic steering system for a vehicle having a movable control surface, a servomotor for moving said surface, reference means on said vehicle for generating a reference signal corresponding to the amount of angular displacement of said vehicle from a predetermined position, a first means responsive to said reference signal for developing a first control signal for operating said servomotor, a second means responsive to said reference signal for developing a second control signal for operating said servomotor, the magnitude of said second signal being determined by the time interval that said displacement signal persists, and control means connected for operation by said reference signal to initiate the development of said second signal at a predetermined value of said reference signal.

8. In an automatic pilot for a vehicle, an input for receiving a signal corresponding to the angular displacement of said vehicle from a predetermined reference, a first means responsive to said input signal for developing a signal whose magnitude corresponds to the time interval of persistence of said displacement signal, summation means for combining said time and displacement signals, and a switch means actuated by a predetermined input signal for initiating the development of said time signal.

9. In an automatic pilot for a vehicle, a means for generating a reference signal corresponding to the angular displacement of said vehicle from a predetermined reference, a means responsive to the reference signal for developing a time signal whose magnitude corresponds to the time interval of persistence of said displacement signal, a means to combine said time and displacement signals to provide a signal for said vehicle, and a control means associated with said reference signal to initiate the development of said time signal upon the attainment of a predetermined reference signal.

10. Apparatus for an aircraft having thereon an automatic pilot and a receiver for receiving radiant energy for guiding said craft onto a ground track as defined by a source of radiant energy, comprising means for deriving from said received energy a signal proportional to the angular displacement of the aircraft from said ground track, means for deriving from said received energy a further signal dependent upon the time of persistence of said displacement signal, means for inserting the displacement and time signals into the automatic pilot to steer the craft to said ground track and maintain it on said ground track, and means responsive to a predetermined value of the displacement signal for controlling the heading of the craft in its initial approach to said ground track by blocking the operation of said time signal means until the craft reaches predetermined displacement.

References Cited in the file of this patent

UNITED STATES PATENTS

| | | |
|---|---|---|
| 2,482,809 | Thompson | Sept. 27, 1949 |
| 2,592,173 | Noxon et al. | Apr. 8, 1952 |